March 22, 1932.  S. BEATTY  1,850,652
BRAKE MECHANISM
Filed Feb. 26, 1931
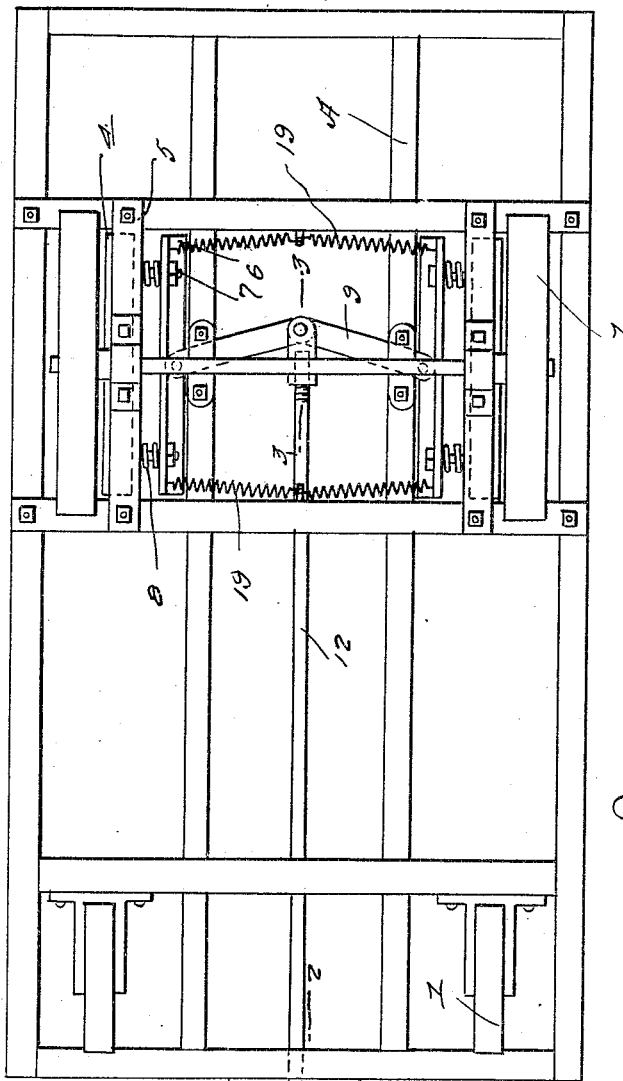
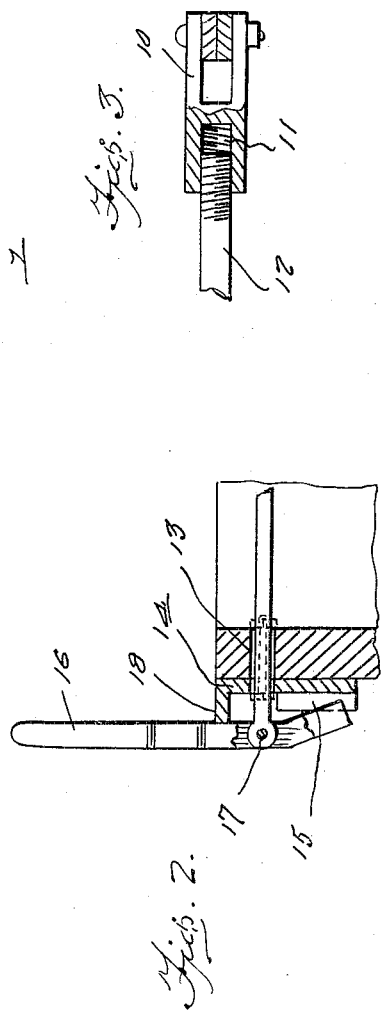
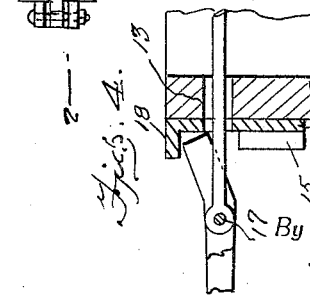
Inventor
Stanley Beatty
By Clarence A O'Brien
Attorney Patented Mar. 22, 1932

1,850,652

UNITED STATES PATENT OFFICE

STANLEY BEATTY, OF HIGHLAND, NEW YORK

BRAKE MECHANISM

Application filed February 26, 1931. Serial No. 518,575.

This invention relates to controlling means for the brake mechanism forming the subject matter of a patent granted to me on December 16, 1930, No. 1,785,432, the general object of the invention being to provide a lever arrangement for operating the brake mechanism and for adjusting the parts when the brake shoes wear so as to take up this wear.

This invention also consists in certain other features of construction, and in this combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a bottom plan view of a truck provided with the brake mechanism described in the above-mentioned patent and showing the mechanism controlled by the improved means.

Fig. 2 is a section on the line 2—2 of Fig. 1.
Fig. 3 is a section on the line 3—3 of Fig. 1.
Fig. 4 is a detail view of the brake applying parts.

In the drawings, the letter A indicates the truck frame which is supported by the wheels 1, and the numeral 4 indicates a pair of brake shoes for engaging the rear wheels 1 when the truck is to be braked. These shoes are supported by the blocks 5 and each shoe is connected to an angle iron 6 by the bolts 7 with springs 8 arranged on the bolts and located between the shoe and the angle iron.

A pair of links 9 have their outer ends connected with the angle irons and their inner ends are pivotally connected to a clevis 10 which is formed with a threaded socket 11. A rod 12 has a threaded end threaded in the socket 11 and by moving the rod longitudinally, the links 9 will be moved to a position to cause the angle irons 6 to compress the springs 8, and thus cause said springs to yieldingly force the shoes against the wheel.

Of course in the position shown in Fig. 1, the parts are in a position with the brake shoes out of engagement with the wheels. This arrangement is the same as that shown in the patent excepting that the bar 12 is threaded to the clevis so that the bar can be adjustably connected with the clevis to take up wear on the brake shoes as will be hereinafter described.

The front end of the bar 12 passes through a hole 13 in the front frame of the truck and through a hole in a plate 14 fastened to the front member of the frame. This plate or member 14 carries a forwardly extending pin 15 and the fork part of the lever 16 has its prongs passing one on each side of the front end of the bar 12 and the pin 15.

The front end of the rod is formed with an eye and a pivot pin 16 passes thru this eye and the prongs of the fork.

From the foregoing it will be seen that by rocking the lever on the flange 18 at the upper end of the plate 14, the rod 12 can be adjusted longitudinally to apply the brake or to retract the brake, and the pin 15 acts as a guide for the movement of the lever. By screwing the rod 12 in or out of the socket 11, the parts can be adjusted to take up wear of the blocks 4.

It is thought from the foregoing description that the advantages and novel features of the invention will be readily apparent.

It is to be understood that changes may be made in the construction, and in the combination and arrangement of the several parts, provided that such changes fall within the scope of the appended claim.

Having thus described my invention, what I claim as new is:—

In a brake device including a pair of oppositely arranged shoes supported for movement towards and away from each other, link members moving the shoes into operative and inoperative position, said link members having their outer ends connected to parts of the shoes, a clevis pivotally connected to the inner end of the link members, a rod having one end threaded in the clevis, a stationary plate having a hole therein through which the other end of the rod passes, a forked lever between the prongs of which the rod is pivoted, said prongs being bent towards the plate, a flange at the top of the plate engaged by the extremities of the prongs, when the lever is moved into substantially horizontal position to apply the brake, and a vertically arranged rib on the plate extended between the prongs for guiding the lever in its movement.

In testimony whereof I affix my signature.
STANLEY BEATTY.